(No Model.)
J. G. BROMAN.
STEAM JOINT PACKING.
No. 477,640. Patented June 28, 1892.
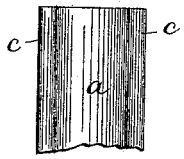
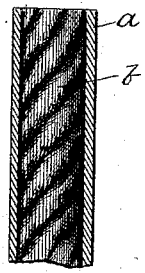
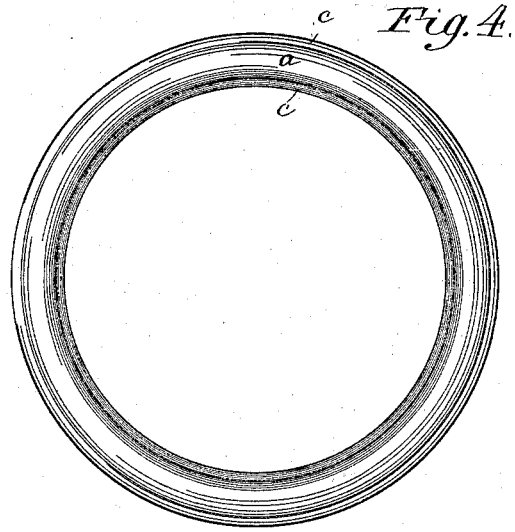
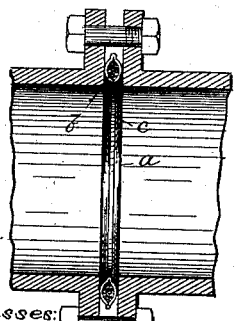
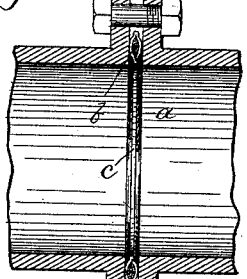
Witnesses:
Geo. C. Curtis
H. W. Munday
Inventor:
John G. Broman
By Munday, Evarts & Adcock
His Attorneys

UNITED STATES PATENT OFFICE.

JOHN G. BROMAN, OF CHICAGO, ILLINOIS.

STEAM-JOINT PACKING.

SPECIFICATION forming part of Letters Patent No. 477,640, dated June 28, 1892.

Application filed December 22, 1890. Renewed February 20, 1892. Serial No. 422,195. (No model.)

*To all whom it may concern:*

Be it known that I, JOHN G. BROMAN, a citizen of the United States, residing in Chicago, in the county of Cook and State of Illinois, have invented a new and useful Improvement in Packing for Steam-Joints, &c., of which the following is a specification.

This invention has been devised more especially for use in steam pipes and boilers; but it can obviously be used as a packing for other joints where water and other fluids are used.

The details of my invention are fully set forth in the following detailed description, and are also illustrated in the accompanying drawings, wherein—

Figure 1 is a cross-section, and Fig. 2 is a longitudinal vertical section, of my invention. Fig. 3 is a partial exterior view. Fig. 4 shows a plan of an annular gasket embodying the invention. Figs. 5 and 6 show the packing in use, Fig. 6 showing it somewhat more compressed than Fig. 5.

In said drawings, $a$ represents an inclosing tube, of soft metal—such, for instance, as lead, soft copper, &c. It may be a seamless tube or not, as desired, its requisites being that it should be sufficiently soft so that it will conform to the surface of the pipes or other parts between which it is placed, that it should be a metal adapted to resist the fluid contained in the pipes between which it is employed, and, lastly, that it should sufficiently inclose the elastic filling so that the latter cannot escape from between the sides of the tube which receive the compression. I prefer, however, to make the tube continuous and fluid-proof, because thereby the elastic packing is saved from exposure to the steam or other fluid in the pipes and from all other external influences.

The elastic filling is shown at $b$. I employ for this filling asbestus or asbestus wicking, as those materials retain their elasticity under severe pressure and for as long a period of time as the packing can be ordinarily used. It is also a desirable material because it resists heat. I find also that it is an advantage, especially with the asbestus wicking, to twist several strands together after the manner shown at Fig. 2, as thereby a greater degree of elasticity is insured than would be present if the fibers laid parallel and straight. This filling may be inserted in the tube in any known way, either at the time of manufacturing the tube or at the time of closing the seam therein, if there be one, or subsequent to the completion of the tube. The tubing with its inclosed filling may be next formed into an annulus, in which, if the ends be properly joined, the filling will be effectually shielded from all contact with the contents of the pipes and from all external atmospheric or other influences.

In the form shown, the tube is compressed or slightly flattened and the ridges $c$ formed at opposie sides thereof, the filling $b$ being of the character already described. The object of this modification is to give the packing a bearing at the center of each of its sides which come in contact with the parts of the joint and also to render the necessary collapse which takes place in use uniform throughout all parts of the packing. This latter feature is due to the presence at the sides of the packing of the ribs $c$, such ribs possessing sufficient stiffness to prevent any greater spread or movement by the elastic packing under the compression toward one side than toward the other. This might not be the case with a perfectly-round tube, as I have found some tendency by the packing in that construction to move almost entirely to one side instead of expanding equally on both sides. The action under the compression caused by the tightening of the joint is well illustrated at Figs. 5 and 6, the tube merely flattening under the pressure without losing its symmetry, the expansion being about equal upon both its inner and outer edges.

With my invention I find it practically impossible to deprive the packing of all its elasticity, even when compressed beyond the extent shown in Fig. 7, so that it retains its usefulness greatly beyond the term of life of ordinary packings. The operation of tightening the joint is rendered easy, as an ordinary steam-joint may be sufficiently tightened I have found ofttimes without the use of a wrench. I also notice that in loosening the bolts of the joint the nut must be loosened quite a good deal before the joint can be said to be open, the expanding force of the elastic packing causing the packing to expand as the joint opens.

I claim—

1. The packing for steam and other joints, consisting of the inclosing soft metal, having ridges c, and a twisted fibrous asbestus filling, substantially as set forth.

2. The packing for steam and other joints, consisting of an inclosing tube having ridges c c at either side and an elastic filling, substantially as set forth.

JOHN G. BROMAN.

Witnesses:
EMMA HACK,
H. M. MUNDAY.